United States Patent [19]
Yamada et al.

[11] Patent Number: 5,652,040
[45] Date of Patent: Jul. 29, 1997

[54] MAGNETIC RECORDING MEDIUM

[75] Inventors: Takashi Yamada, Yokohama; Naohiro Shoda, Tokyo, both of Japan

[73] Assignee: Kabushiki Kaisha Toshiba, Kawasaki, Japan

[21] Appl. No.: 503,686

[22] Filed: Jul. 18, 1995

Related U.S. Application Data

[63] Continuation of Ser. No. 17,369, Feb. 12, 1993, Pat. No. 5,458,947, which is a continuation-in-part of Ser. No. 605,358, Oct. 30, 1990, abandoned.

[30] Foreign Application Priority Data

Oct. 31, 1989 [JP] Japan ................................ 1-281691
Aug. 2, 1990 [JP] Japan ................................ 2-203916

[51] Int. Cl.$^6$ .............................. G11B 5/66; B05D 5/12; B32B 3/10
[52] U.S. Cl. .................... 428/141; 428/336; 428/480; 428/500; 428/900; 428/694 BS; 428/694 BR; 428/694 ST; 428/694 SL; 428/694 SG; 428/694 BH; 428/694 TR; 427/127; 427/129; 204/192.12; 204/192.32; 204/192.34; 204/192.36
[58] Field of Search ............................. 428/141, 336, 428/480, 500, 900, 694 BS, 694 BR, 694 ST, 694 SL, 694 SG, 694 BH, 694 TR; 427/127, 129; 204/192.12, 192.32, 192.34, 192.36

[56] References Cited

U.S. PATENT DOCUMENTS

| | | | |
|---|---|---|---|
| 4,707,380 | 11/1987 | Hasgimoti et al. | 427/502 |
| 4,725,472 | 2/1988 | Okale et al. | 428/141 |
| 4,743,487 | 5/1988 | Saito et al. | 428/141 |
| 4,746,558 | 5/1988 | Shimozawa | 428/141 |
| 4,758,866 | 7/1988 | Shimozowa | 428/141 |
| 4,780,354 | 10/1988 | Nakayama et al. | 428/141 |
| 4,818,581 | 4/1989 | Katoh et al. | 428/143 |
| 4,963,402 | 10/1990 | Wong | 428/141 |
| 4,997,696 | 3/1991 | Kamada et al. | 428/141 |
| 5,266,376 | 11/1993 | Okazoki | 428/141 |
| 5,458,947 | 10/1995 | Yamada | 428/141 |

FOREIGN PATENT DOCUMENTS

| | | |
|---|---|---|
| 0231095 | 5/1987 | European Pat. Off. |
| 3626216 | 2/1987 | Germany |
| 60-133531 | 7/1985 | Japan |
| 60-163234 | 8/1985 | Japan |

*Primary Examiner*—Leszek Kiliman
*Attorney, Agent, or Firm*—Cushman, Darby & Cushman IP Group of Pillsbury Madison & Sutro LLP

[57] ABSTRACT

A magnetic recording medium is provided and includes a support having a surface and a magnetic layer formed on the surface of the support and containing a magnetic powder and a binder resin. The surface of the support is treated by a treatment selected from the group consisting of a glow discharge treatment, a corona discharge treatment, a flaming treatment, a plasma treatment, a polishing treatment and a chemical treatment. The surface of the support has surface roughness values (Ra), measured at cut-off 0.8 mm by a method of needle contact, in the range of 0.004 to 0.015 μm. A mean center line average value (Ra*) of surface roughness value measured by a scanning tunneling microscope in a very small area of 1 μm×1 μm on the support is more than 0.03 μm and not more than 20% of a thickness of the magnetic layer.

11 Claims, 3 Drawing Sheets

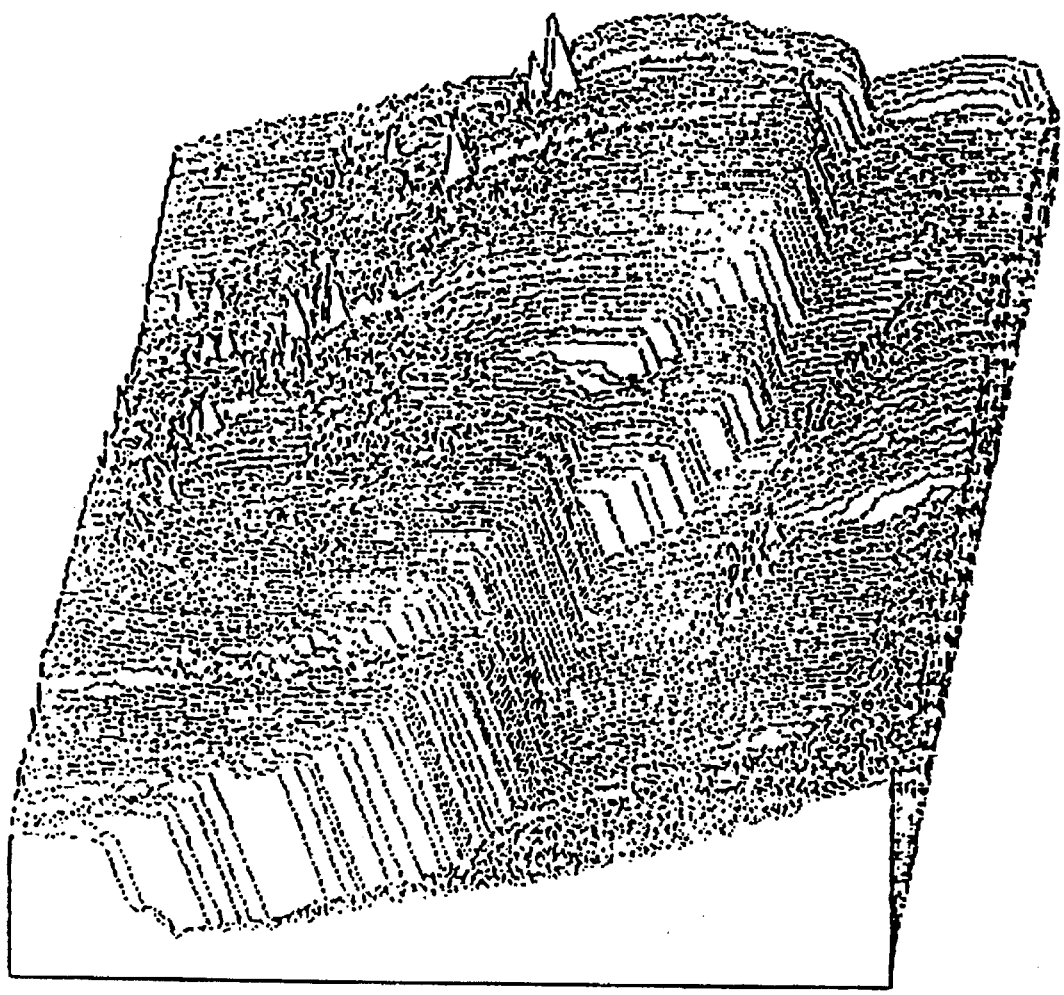
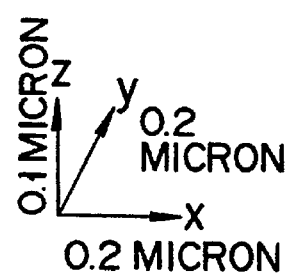
F I G. 1

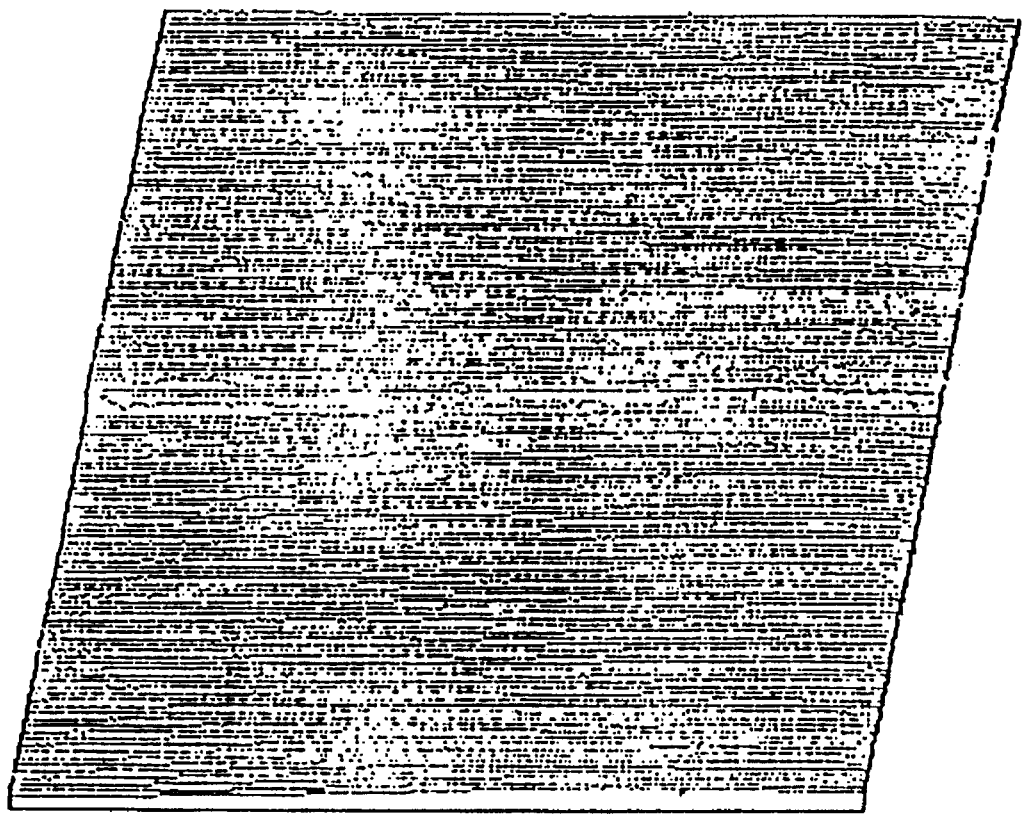
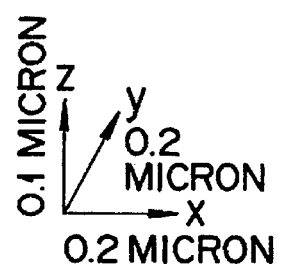
F I G. 2

MAGNETIC RECORDING MEDIUM

This is a continuation of application Ser. No. 08/017,369 filed on Feb. 12, 1993, now U.S. Pat. No. 5,458,347, which is a continuation-in-part of application Ser. No. 07/605,358 filed on Oct. 30, 1990, now abandoned.

BACKGROUND OF THE INVENTION

1. Field of the Invention

The present invention relates to a magnetic recording medium and, more particularly, to a magnetic recording medium excellent in durability and reliability.

2. Description of the Related Art

In recent years, magnetic recording media, i.e., magnetic tapes such as an audio tape and a video tape or magnetic disks such as a floppy disk must satisfy requirements for a high-speed data access and a high recording density in addition to having excellent electromagnetic conversion characteristics.

As a method of increasing a recording density of a magnetic recording medium, a packing density of a magnetic powder in a magnetic layer is attempted to be increased, and a recording density in the widthwise or longitudinal direction of tracks is attempted to be increased utilizing servo techniques. As a method of increasing a data access speed of a magnetic recording medium, an increase in relative speed between a magnetic head and the magnetic recording medium is attempted. In order to satisfy the requirements for a high-speed data access and a high recording density, therefore, the packing density of the magnetic powder in the magnetic layer must be increased, and the relative speed between the magnetic head and the magnetic recording medium must be increased.

When a packing density of a magnetic powder in a magnetic layer is increased, however, a ratio of a binder resin to the magnetic powder in the magnetic layer is relatively decreased. For this reason, adhesion strength between a support and the magnetic layer is degraded. When a relative speed between a magnetic head and a magnetic recording medium having the above magnetic layer is increased, the magnetic layer peels from the support within a short period of time due to contact between the magnetic head and the magnetic layer. Foreign substances such as dust produced upon peeling of the magnetic layer from the support are attached to the surface of the magnetic layer. These foreign substances cause an error in the operation of the magnetic recording medium. As a result, reliability of the magnetic recording medium is greatly impaired.

In order to solve the above problems, for example, Published Japanese Unexamined Patent Application No. 60-163234 discloses a method of manufacturing a magnetic recording medium, wherein an intermediate layer is formed on a nonmagnetic support having an average value of surface roughness values (Ra) of 0.01 μm or more, and then a magnetic layer is formed on this intermediate layer, thereby improving adhesion strength between the magnetic layer and the nonmagnetic support. That is, according to this method, surface roughness of the nonmagnetic support is increased to increase a contact area between the intermediate layer and the nonmagnetic support, thereby improving the adhesion strength.

It is thus possible to improve the adhesion strength between the support and the magnetic layer by increasing surface roughness of the support. When the surface roughness of the support is increased, however, the surface of the magnetic layer conforms to the roughness of the support and is reduced in smoothness. For this reason, a good head touch between the magnetic layer and the magnetic head cannot be obtained. Since the surface roughness of the support is closely associated with the smoothness of the magnetic layer, it is very difficult to improve the smoothness of the surface of the magnetic layer while the surface roughness of the support is increased to improve the adhesion strength between the support and the magnetic layer.

SUMMARY OF THE INVENTION

It is an object of the present invention to provide a magnetic recording medium excellent in smoothness of a surface of a magnetic layer and adhesion strength between the magnetic layer and a support.

According to the present invention, there is provided a magnetic recording medium comprising a support having a surface and a magnetic layer formed on the surface of the support and containing a magnetic powder and a binder resin. The surface of the support is treated by a treatment selected from the group consisting of a glow discharge treatment, a corona discharge treatment, a flaming treatment, a plasma treatment, a polishing treatment and a chemical treatment. The surface of the support has surface roughness values (Ra), measured at cut-off 0.8 mm by a method of needle contact, in the range of 0.004 to 0.015 μm. A mean center line average value (Ra*) of surface roughness value measured by a scanning tunneling microscope in a very small area of 1 μm×1 μm on the support is more than 0.03 μm and not more than 20% of a thickness of the magnetic layer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 1 is a view imaged by a scanning tunneling microscope, showing the surface of a polyethylene terephthalate film (to be referred to as a PET film thereinafter) corona-discharged under specific conditions;

FIG. 2 is a view imaged by the scanning tunneling microscope, showing the surface of a nontreated PET film;

DETAILED DESCRIPTION OF THE PREFERRED EMBODIMENT

Figure 3:
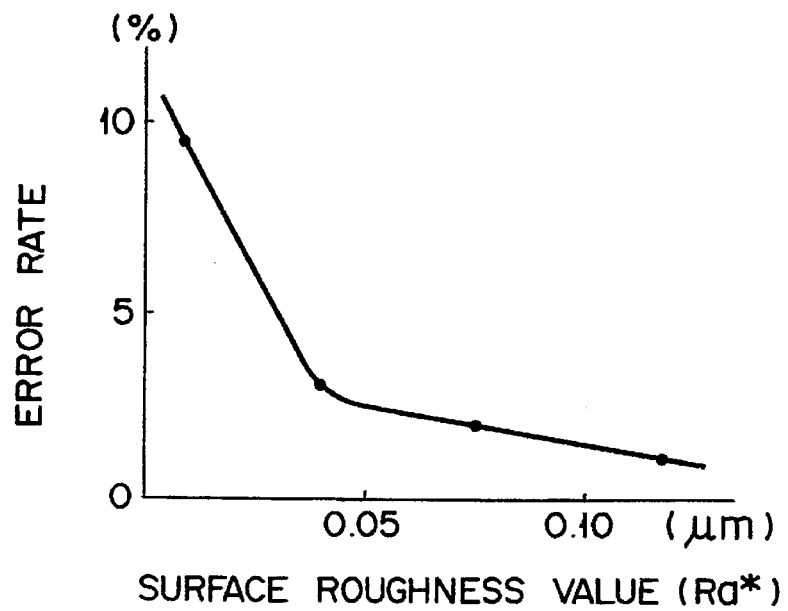
FIG. 3 is a graph showing a relationship between an average value of surface roughness values (Ra*) of any ten 1 μm×1 μm measurement areas within any 10 μm×10 μm areas and a rate of-error occurrence.

Surface roughness of a support of a magnetic recording medium is usually measured by a surface roughness measuring equipment using a probe or laser beam. In such a measurement equipment, the diameter of a probe or laser spot is on the order of several µm. For this reason, when a very small area of several µm² is measured by such a measurement equipment, the probe or laser spot cannot follow a very low unevenness on the surface of the support and measures the surface of the very small area of several µm² as a smooth surface.

The present inventors paid attention to a very small area of, i.e., several µm² of small areas measured as smooth areas by the surface roughness measurement equipment using a probe or laser beam. The present inventors found that when the surface of the support was finely roughened within this area, a magnetic recording medium which could assure good adhesion strength between the magnetic layer and the support and which was excellent in smoothness of the surface of the magnetic layer could be obtained.

In this specification, a surface roughness value (Ra*) in a very small area is defined as a value obtained by measuring any 1 µm×1 µm very small area by a three-dimensional roughness gauge (i.e., a scanning tunneling microscope) using a tunnel current.

The scanning tunneling microscope used in measurements of surface roughness values (Ra*) of supports of magnetic recording media according to the present invention will be briefly described.

In general, when a voltage is applied between a conductive material and a metal probe spaced apart from the conductive material by about 1 nm, a tunnel current flows between the conductive material and the metal probe. An amount of tunnel current depends on a distance between the conductive material and the metal probe. For example, when the distance between the conductive material and the metal probe is changed by 0.1 nm, the tunnel current is changed about ten times.

When surface roughness is to be measured by the scanning tunneling microscope according to the above principle, the tip of a metal probe is spaced apart from a conductive sample by about 1 nm so as to oppose the conductive sample. The metal probe is horizontally moved with respect to the sample. The metal probe is vertically moved so that an amount of tunnel current flowing between the sample and the metal probe is kept constant. The vertical movement of the metal probe is visualized to measure the surface roughness. According to this method of measuring the surface roughness values, the tunnel current changes depending on the distance between the sample surface and the metal probe, but not depending on the diameter of the metal probe. Surface roughness values of a very small area of several µm² of the sample can be accurately measured.

Measurements of surface roughness values (Ra*) therein were made in atmospheric air under the conditions that samples each having a surface uniformly deposited with gold having a thickness of 22 nm were used, a measurement area was given as 1 µm×1 µm, a voltage applied between a metal probe and a sample surface was 0.5 V, and a preset tunnel current was 0.5 nA. Surface roughness values (Ra*) are calculated using the obtained data as follows:

$$Ra^* = 1/S(\iint |f(x,y)|dxdy)$$
$$= 1/N \left( \sum_j \sum_i |f(xi,yj)| \right)$$

where f(x,y): height at coordinates (x,y)

S: measurement area

N: total number of measurement points

The present inventors found that excellent adhesion strength between a support and a magnetic layer was exhibited when an average value of surface roughness values (Ra*) of any ten 1 µm×1 µm measurement areas within any 10 µm×10 µm area of a surface of the support was 0.03 µm or more. If the average value of the surface roughness values (Ra*) is smaller than 0.03 µm, adhesion strength between the support and the magnetic layer is insufficient. In particular, when the average value of the surface roughness values (Ra*) is 0.07 µm or more, good adhesion strength can be stably exhibited. By defining surface roughness by an average value of surface roughness values (Ra*) of any ten 1 µm×1 µm measurement areas within any 10 µm×10 µm area, supports having excessive local or incidental roughness can be excluded from supports of the present invention.

In addition, a surface roughness value (Ra*) of a surface of a support is set to be 20% or less of the thickness of a magnetic layer. A smooth magnetic layer can be obtained without forming a buffer layer for reducing unevenness on the surface of the support between the support and the magnetic layer. When the surface roughness value (Ra*) exceeds 20% of the thickness of the magnetic layer, smoothness of the surface of the magnetic layer is degraded, and a head touch between the magnetic layer and the magnetic head is impaired.

The thickness of a magnetic layer preferably falls within the range of 0.25 to 4 µm depending on applications. When the thickness of the magnetic layer is less than 0.25 µm, smoothness of surface of the magnetic layer is degraded. When the thickness of the magnetic layer exceeds 4 µm, the internal structure of the magnetic layer may be damaged during sliding contact between the magnetic layer and the magnetic head.

Further, since over-write properties depend upon the thickness of the magnetic layer, the thickness should be within the range of 0.25 to 1.0 µm on the high-density recording area. According to this invention, formation of the magnetic layer with the thin film reduces surface influences and does not degrade the properties of S/N ratio. However, since the surface roughness value (Ra) of the support influences the surface of the magnetic layer, it is necessary to determine the surface roughness value (Ra) within its optimum range, together with the average value surface roughness (Ra*). The present inventors further found from various experiments that a surface of a support was formed to have a stepwise unevenness (stepwise projection and depression) to further increase the adhesion strength between the support and the magnetic layer. That is, the surface of the support having the stepwise unevenness has a larger contact area with the magnetic layer. For this reason, the adhesion strength under shear between the support and the magnetic layer by sliding contact between them is deemed higher.

As a method of forming such a stepwise unevenness, a noncontact surface treatment such as glow discharge treatment, corona discharge treatment, or flaming treatment, a contact surface treatment such as polishing, or a chemical treatment may be performed under specific conditions.

FIG. 1 is a perspective view of an image of a PET film surface corona-discharged under specific conditions, the image being obtained by a scanning tunneling microscope. A support having a shape shown in FIG. 1 is used as a support of such a magnetic recording medium according to the present invention.

FIG. 2 is a perspective view of an image of a nontreated PET film surface which is obtained by the scanning tunneling microscope. As is apparent from FIGS. 1 and 2, it is readily understood that the PET film having a stepwise unevenness and the nontreated PET film have different surface shapes. Surface roughness values (Ra*) of any ten 1 μm×1 μm measurement areas within any 10 μm×10 μm area of the PET film surface shown in FIG. 1 were measured, and an average value of these surface roughness values (Ra*) was measured to be 0.22 μm. To the contrary, an average value of surface roughness values (Ra*) of the PET film shown in FIG. 2 was 0.005 μm.

A polyester resin such as PET, a polyolefin resin such as polyethylene, and a vinyl resin may be used as the support material. The support may have a tape-, sheet-, or disk-like shape.

As described above, when the thickness of the magnetic layer is determined to be within the range of 0.25 to 1.0 μm to maintain the over-write properties in the high-density recording area, it is necessary to determine the surface roughness value (Ra) in its optimum range, together with the surface roughness value (Ra*) of the support.

In general, a support whose surface roughness value (Ra) is in the range of 0.004 to 0.015 μm can be used. If the thickness of the magnetic layer is in this range, it is preferable to use a support having the surface roughness value (Ra) in the range of 0.004 to 0.008 μm. A particularly preferably support has its surface roughness value in the range of 0.004 to 0.006 μm.

When a thickness of the magnetic layer is in the range of 0.25 to 1.0 μm and the surface roughness value (Ra) is smaller than 0.004 μm, when a support is wound round the roller, it is so closely adhered to the roller and cannot preferably run. This degrades productivity. When a thickness of the magnetic layer is in the range of 0.25 to 1.0 μm and the surface roughness value (Ra) exceeds 0.008 μm, the surface condition of the magnetic recording medium, the spacing loss between the magnetic head and the magnetic layer is increased and the properties of the S/N ratio are degraded.

An acicular magnetic powder such as $\gamma$-$Fe_2O_3$, Co-doped $\gamma$-$Fe_2O_3$, or $Fe_2O_4$ having an easy-magnetized-axis along the longitudinal direction of its crystal, a hexagonal crystalline system ferromagnetic powder such as barium ferrite or strontium ferrite having an easy magnetized-axis along the vertically direction of flat surface of its crystal, and a metal powder of such as Fe-Co, Co-Ni, or Fe-Co-Ni may be used as the magnetic powder of the magnetic layer. The magnetic recording medium according to the present invention is applicable to either a longitudinal recording method or a perpendicular recording method. Of these materials, a hexagonal crystalline system ferromagnetic powder is preferable because it can be easily controlled to have a small particle size. In the present invention, a hexagonal crystalline system ferromagnetic powder having an average particle size of 0.01 to 0.1 μm is preferable because a powder having a small particle size is sufficiently filled in recesses of the fine unevenness formed on the surface of the support, thereby improving magnetic characteristics of the magnetic recording medium and durability of the magnetic layer.

A vinyl chloride-vinyl acetate copolymer, a vinyl chloride-vinyl acetate alcohol copolymer, a vinyl chloride-vinylidene chloride copolymer, a vinyl chloride-acrylonitrile copolymer, an acrylic esteracrylonitrile copolymer, thermoplastic polyurethane resin, a thermo-setting polyurethane resin, a polyester resin, a cellulose derivative, and the like may be used as the binder resin in the magnetic layer.

The weight of a magnetic powder in a magnetic layer is preferably set to be one time to nine times the weight of the binder resin. When the weight of the magnetic powder is less than that of the binder resin, the resultant magnetic recording medium cannot provide sufficient reproduction outputs. When the weight of the magnetic powder exceeds nine times the weight of the binder resin, the adhesion strength between the support and the magnetic layer is degraded. The weight of the magnetic powder is most preferably five times the weight of the binder resin.

A higher aliphatic acid such as oleic acid, stearic acid, or myristic acid, an aliphatic ester, a solid lubricant, and the like may be used as a lubricant in the magnetic layer.

Additives such as a reinforcing agent (e.g., aluminum oxide or chromium oxide), and an anti-static agent (e.g., such as carbon black) may be contained in a magnetic layer in a range without impairing characteristics of a magnetic recording medium of the present invention.

As a method of forming a magnetic layer on a surface of a support, for example, a magnetic coating composition consisting of a binder resin and a magnetic powder is coated to the surface of a support and is then dried.

A ketone such as acetone, methyl ethyl ketone, or cyclohexanone, an alcohol such as ethanol or butanol, an ester such as methyl acetate or ethyl acetate, and an aromatic hydrocarbon such as benzene, toluene, or xylene may be used as an organic solvent used to blend a magnetic paint consisting of a binder resin and a magnetic powder.

EXAMPLES

Example 1

The present invention will become more apparent in the following description and the accompanying drawing.

100 parts by weight of a Co-Ti substituted Ba ferrite powder having an average particle size of 0.08 μm and a coercive fore Hc of 700 Oe, 10 parts by weight of a vinyl chloride-vinyl acetate copolymer, 10 parts by weight of a polyurethane resin, 3 parts by weight of lecithin, 0.1 part by weight of stearic acid, 0.1 part by weight of n-butyl stearate, 80 parts by weight of methyl ethyl ketone, 80 parts by weight of cyclohexanone, and 80 parts by weight of toluene were sufficiently kneaded using a sand grinder. A kneaded material is added with 4 parts by weight of an alumina powder having an average particle size of 0.4 μm and 3 parts by weight of a carbon powder having an average particle size of 0.05 μm, and these powders were uniformly dispersed. The resultant mixture was added with 3 parts by weight of an isocyanate compound as a hardener. The mixture was kneaded to prepare a magnetic paint.

A PET film having a thickness of 75 μm was treated in a plasma generated with a power of 400 W and a frequency of 13.56 MHz at a low temperature for 14 minutes in an atmosphere of 1 Torr as an internal pressure of a reactor. The surface roughness values (Ra) of this PET film were measured to be 0.012 μm at cut-off of 0.8 mm, by a needle-contacting surface roughness measure (produced by KOSAKA; product No. SE-3AK). Surface roughness values (Ra*) of any ten 1 μm×1 μm measurement areas within any 10 μm×10 μm area on the PET film surface treated with a plasma at a low temperature were measured using a scanning tunneling microscope. An average value of the measured Ra* values was measured to be 0.12 μm.

The resultant magnetic coating composition was coated by a reverse coater an the PET film surface finely roughened by the low-temperature plasma treatment. The coated film was dried and hardened to form a magnetic layer having a thickness of 3 μm. Thereafter, the PET film having the magnetic film was calendared to prepare a magnetic recording medium having a magnetic layer having a thickness of 2.5 µm. The average value of the surface roughness values of the PET film was 0.12 µm and was smaller than 0.5 µm, which was 20% of the thickness (2.5 µm) of the magnetic layer.

The resultant magnetic recording medium was punched into a disk having a diameter of 90 mm. The surface of the disk was polished by a polishing tape. A metal hub was mounted at the central portion of the polished disk and was rotatably housed in an ABS resin jacket having an unwoven fabric and a biasing means on a magnetic recording medium contact surface, thereby preparing a magnetic disk cartridge.

Example 2

In the same manner as Example 1, except that the magnetic layer thickness is 0.8 µm, a magnetic recording medium was produced and a magnetic disk cartridge was prepared.

Example 3

In the same manner as Example 1, except that the magnetic layer thickness is 0.8 µm, a magnetic recording medium was produced and a magnetic disk cartridge was prepared, with use of PET film whose surface roughness values (Ra) was 0.007 µm.

Example 4

In the same manner as Example 1, except that the magnetic layer thickness is 0.8 µm, a magnetic recording medium was produced and a magnetic disk cartridge was prepared, with use of PET film whose surface roughness values (Ra) was 0.0059 µm.

Comparative Example 1

In the same manner as Example 1, without using a PET film treated in a plasma, a magnetic recording medium was produced and a magnetic disk cartridge was prepared.

Comparative Example 2

In the same manner as Example 3, without using a PET film treated in a plasma, a magnetic recording medium was produced and a magnetic disk cartridge was prepared.

Comparative Example 3

In the same manner as Example 4, without using a PET film treated in a plasma, a magnetic recording medium was produced and a magnetic disk cartridge was prepared.

The magnetic disk cartridges prepared in Examples 1–4 and Comparative Examples 1–3 were tested, with reference to an error test, a magnetic layer adhesion strength test and a S/N ratio test.

The error test was performed using test dust class 2 complying with JIS Z8901 and at a dust concentration which was 100,000 times the dust concentration of a normal indoor atmosphere, and recording and reproduction operations of the resultant magnetic disk cartridges were repeatedly performed. At this time, these sample cartridges were evaluated by calculating error occurrence rates in accordance with the number of magnetic disk cartridges which generated hard errors within 60 minutes.

The magnetic layer adhesion strength test was performed such that a test jig was adhered to each magnetic layer by an epoxy resin adhesive, and a tensile load was applied on the test jig in the vertical direction to the magnetic layer. At this time, the adhesion strength was evaluated by a maximum load which caused peeling of the magnetic layer from the support.

The S/N ratio was measured with use of a ring head whose head gap was at 0.6 µm. The results are indicated in Table 1.

TABLE 1

|  | Ra* (µm) | Ra (µm) | S/N (dB) | error occurrence rate (%) | adhesion strength (kg/cm²) |
| --- | --- | --- | --- | --- | --- |
| Example 1 | 0.12 | 0.012 | ±0 | 1.1 | 93 |
| Example 2 | 0.12 | 0.012 | −2.2 | 2.2 | 95 |
| Example 3 | 0.11 | 0.007 | −0.6 | 2.5 | 88 |
| Example 4 | 0.11 | 0.0059 | −0.2 | 2.7 | 85 |
| Comparative Example 1 | 0.01 | 0.012 | ±0 | 9.1 | 23 |
| Comparative Example 2 | 0.01 | 0.007 | −0.6 | 10.5 | 20 |
| Comparative Example 3 | 0.01 | 0.0059 | −0.2 | 11.2 | 18 |

As is obvious from Table 1, in Examples 1–4, the S/N ratio, the error occurrence rate, and the adhesion strength were good. On the other hand, in Comparative Examples 1–3, the error occurrence rate and the adhesion strength were significantly worse than Examples 1–4.

Figure 4:
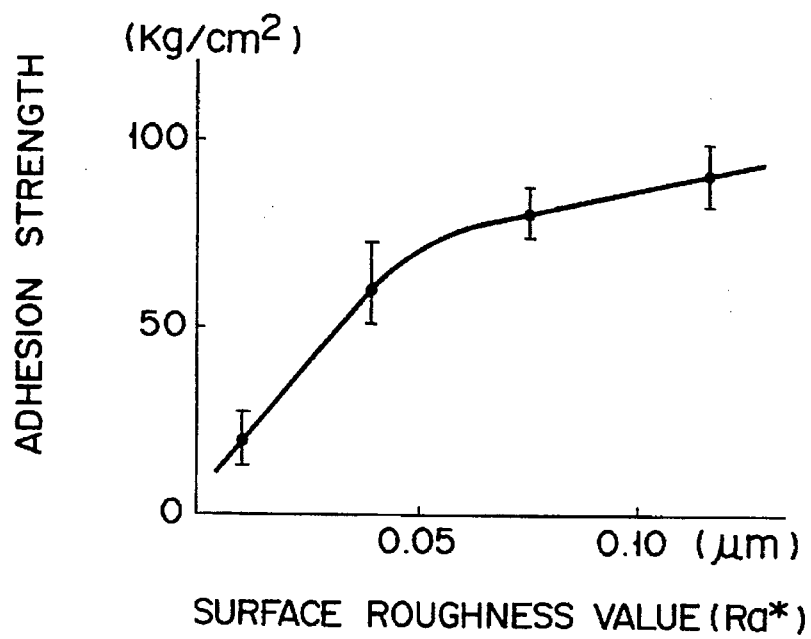
FIG. 4 is a graph showing a relationship between an average value of surface roughness values (Ra*) of any ten 1 μm×1 μm measurement areas within any 10 μm×10 μm areas and adhesion strength.

FIG. 3 is a graph showing a relationship between an average value of surface roughness values (Ra*) of any ten 1 µm×1 µm measurement areas and an error occurrence rate. FIG. 4 is a graph showing a relationship between an average value of surface roughness values (Ra*) of any ten 10 µm×10 µm measurement areas and adhesion strength. As is apparent from these graphs, when the average value of the surface roughness values (Ra*) is 0.03 µm or more, the adhesive strength is high, and the error occurrence rate is low.

In the magnetic recording medium according to the present invention, since the average value of the surface roughness values (Ra*) of the support is set to be 0.03 µm or more and 20% or less the thickness of the magnetic layer, excellent smoothness of the surface of the magnetic layer and the high adhesion strength between the magnetic layer and the support can be obtained. For this reason, an error caused by peeling of the magnetic layer from the support can be prevented. Therefore, the magnetic recording medium according to the present invention can be used with high durability and high reliability.

In the magnetic recording medium according to the present invention, sufficient electro-magnetic characteristics can be obtained without forming an intermediate layer, and the manufacturing cost can be reduced. The above embodiment exemplifies a magnetic recording medium without an intermediate layer. However, a magnetic layer may be formed on a support through an intermediate layer such as a conductive or adhesive layer.

In this embodiment, the low-temperature plasma treatment is performed to form a predetermined surface pattern on the support. However, this predetermined surface pattern may be formed on a support by using other treatments.

The present invention is exemplified by a magnetic disk cartridge. However, the present invention is also applicable to various magnetic recording media such as a video tape, an audio tape, and a data tape.

In this invention, an over-write effect is increased by decreasing the thickness of the magnetic recording medium.

In addition, since the amount of the magnetic paint used can be decreased, manufacturing costs can be reduced.

Additional advantages and modifications will readily occur to those skilled in the art. Therefore, the invention in its broader aspects is not limited to the specific details, and representative devices, shown and described. Accordingly, various modifications may be made without departing from the spirit or scope of the general inventive concept as defined by the appended claims and their equivalents.

What is claimed is:

1. A magnetic recording medium comprising:
   a support having a surface; and
   a magnetic layer formed on said surface of the support and containing a magnetic powder and a binder resin;
   wherein the surface of said support is treated by a treatment selected from the group consisting of a glow discharge treatment, a corona discharge treatment, a flaming treatment, a plasma treatment, a polishing treatment and a chemical treatment;
   the surface of said support has surface roughness values (Ra), measured at cut-off 0.8 mm by a method of needle contact, in the range of 0.004 to 0.015 µm; and
   a mean center line average value (Ra*) of surface roughness value measured by a scanning tunneling microscope in a very small area of 1 µm×1 µm on said support is more than 0.03 µm and not more than 20% of a thickness of said magnetic layer.

2. The medium according to claim 1, wherein said mean center line average value (Ra*) of surface roughness value denotes the average value of the surface roughness values of any ten 1 µm×1 µm very small areas within any 10 µm×10 µm area.

3. The medium according to claim 1, wherein the thickness of said magnetic layer falls within a range of 0.35 to 4 µm.

4. The medium according to claim 1, wherein said support has a stepwise unevenness on a surface thereof.

5. The medium according to claim 1, wherein said surface of said support is made of a resin selected from the group consisting of a polyester resin, a polyolefin resin, and a vinyl resin.

6. The medium according to claim 1, wherein the magnetic powder is a hexagonal crystalline system ferromagnetic powder.

7. The medium according to claim 1, wherein a weight of the magnetic powder in said magnetic layer falls within a range of one time to nine times a weight of said binder resin.

8. The medium according to claim 1, further comprising an intermediate layer formed between said support and said magnetic layer.

9. The medium according to claim 1, wherein a thickness of the magnetic layer is in the range of 0.25 to 1.0 µm.

10. The medium according to claim 1, wherein surface roughness values (Ra) of the support is in the range of 0.004 to 0.008 µm.

11. The medium according to claim 1, wherein surface roughness value (Ra) of the support is in the range of 0.004 to 0.006 µm.

* * * * *